United States Patent
Ye et al.

(10) Patent No.: US 10,123,326 B2
(45) Date of Patent: Nov. 6, 2018

(54) METHOD AND APPARATUS FOR RESOURCE ALLOCATION AND FOR SCHEDULING CELLULAR AND COORDINATED MULTIPOINT TRANSMISSIONS IN HETEROGENEOUS WIRELESS NETWORKS

(71) Applicants: Qiaoyang Ye, Fremont, CA (US); Ozgun Bursalioglu Yilmaz, Santa Clara, CA (US); Haralabos Papadopoulos, Los Altos, CA (US)

(72) Inventors: Qiaoyang Ye, Fremont, CA (US); Ozgun Bursalioglu Yilmaz, Santa Clara, CA (US); Haralabos Papadopoulos, Los Altos, CA (US)

(73) Assignee: NTT DOCOMO, INC., Tokyo (JP)

( * ) Notice: Subject to any disclaimer, the term of this patent is extended or adjusted under 35 U.S.C. 154(b) by 150 days.

(21) Appl. No.: 15/065,117

(22) Filed: Mar. 9, 2016

(65) Prior Publication Data
US 2016/0270073 A1   Sep. 15, 2016

Related U.S. Application Data

(60) Provisional application No. 62/132,347, filed on Mar. 12, 2015.

(51) Int. Cl.
| | |
|---|---|
| *H04W 4/00* | (2018.01) |
| *H04W 72/04* | (2009.01) |
| *H04B 7/024* | (2017.01) |
| *H04B 7/0413* | (2017.01) |
| *H04W 28/08* | (2009.01) |
| *H04W 72/12* | (2009.01) |

(52) U.S. Cl.
CPC ........ *H04W 72/0446* (2013.01); *H04B 7/024* (2013.01); *H04B 7/0413* (2013.01); *H04W 28/08* (2013.01); *H04W 72/12* (2013.01)

(58) Field of Classification Search
CPC .... H04B 7/024; H04W 28/08; H04W 72/005; H04W 72/04
See application file for complete search history.

(56) References Cited

U.S. PATENT DOCUMENTS

| | | | | |
|---|---|---|---|---|
| 2011/0305164 | A1* | 12/2011 | Zhang | H04B 7/024 370/252 |
| 2012/0014272 | A1* | 1/2012 | Zhou | H04L 5/0035 370/252 |
| 2016/0270031 | A1* | 9/2016 | Sundaresan | H04W 72/005 |

* cited by examiner

*Primary Examiner* — Kevin C. Harper
(74) *Attorney, Agent, or Firm* — Womble Bond Dickinson (US) LLP

(57) ABSTRACT

A method and apparatus is disclosed herein for resource allocation in a wireless communication system are disclosed. In one embodiment, the method comprises allocating portions of the resources available to a subset of base stations of the plurality of base stations to serve a subset of UTs from clusters of base stations with cluster sizes including at least one with two or more base stations, where each of the portions of resources are allocated to serve one UT via a user-dependent cluster of base stations; and scheduling UT transmissions over the subset of base stations and scheduling slots, wherein within each of the scheduling slots one or more user terminals are scheduled for transmission, each by its user-dependent cluster of base stations.

33 Claims, 5 Drawing Sheets

ID/132,347, titled, "Method and
METHOD AND APPARATUS FOR RESOURCE ALLOCATION AND FOR SCHEDULING CELLULAR AND COORDINATED MULTIPOINT TRANSMISSIONS IN HETEROGENEOUS WIRELESS NETWORKS

PRIORITY

The present patent application claims priority to and incorporates by reference the corresponding provisional patent application Ser. No. 62/132,347, titled, "Method and Apparatus for Resource Allocation and for Scheduling Cellular and Coordinated Multipoint Transmissions in Heterogeneous Massive MIMO Wireless Networks," filed on Mar. 12, 2015.

FIELD OF THE INVENTION

Embodiments of the present invention relate to the field of wireless communication; more particularly, embodiments of the present invention relate to resource allocation in wireless communication systems in which base stations communicate with users via single point (e.g., cellular) or coordinated multi point transmissions.

BACKGROUND OF THE INVENTION

Dense cellular network deployments relying on the use of Massive multiple-in multiple-out (MIMO) technology are becoming very attractive candidates for future radio access technologies. This is partly due to the promise of Massive MIMO for providing very large throughput increases per base station (BS), due to its ability to multiplex a large number of high-rate streams over each transmission resource element. Massive MIMO is very attractive when it is used over dense (small cell) deployments, and it can then translate to massive throughput increases per unit area with respect to existing deployments.

Non-uniform traffic-load distribution is considered to be a major challenge in small cell networks. If the load cannot be balanced efficiently, the performance gains that are expected as a result of the increased density of network access points (due to use of small cells) may be distributed in a very non-uniform manner within the user population. Various load-balancing techniques have been proposed for dynamically arranging user load across small cells. These techniques are generally designed considering traditional physical (PHY) layer approaches, where one BS serves at most one user at a certain frequency and time resource. But it is well accepted by now that major gains in the PHY layer are expected due to multi-view (MU)-MIMO and especially Massive MIMO.

Current technologies for load balancing in Massive MIMO have a number of important limitations. First, given that the user rates in a MU-MIMO, transmission are not simply a function of large-scale signal-to-interference plus noise ratio (SINR), but in general depend on the scheduling set and the channel realization, the resulting load-balancing techniques are not extendable in any straightforward resource-efficient manner. Furthermore, the nature of reciprocity-based Massive MIMO TDD makes large scale SINR in a link between a user and all BSs in proximity available given a single uplink pilot broadcast from the user. In this context, a centralized processor can determine the UT-BS associations of the user population among a set of BSs that would serve these users, without involving exchanges with the users. Using such a central controller to both perform load balancing (i.e., to balance the user load across BSs) among the BSs and to schedule transmissions at each of the BSs places computational burden to the central controller.

SUMMARY OF THE INVENTION

A method and apparatus is disclosed herein for resource allocation in a wireless communication system are disclosed. In one embodiment, the method comprises allocating portions of the resources available to a subset of base stations of the plurality of base stations to serve a subset of UTs from clusters of base stations with cluster sizes including at least one with two or more base stations, where each of the portions of resources are allocated to serve one UT via a user-dependent cluster of base stations; and scheduling UT transmissions over the subset of base stations and scheduling slots, wherein within each of the scheduling slots one or more user terminals are scheduled for transmission, each by its user-dependent cluster of base stations.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
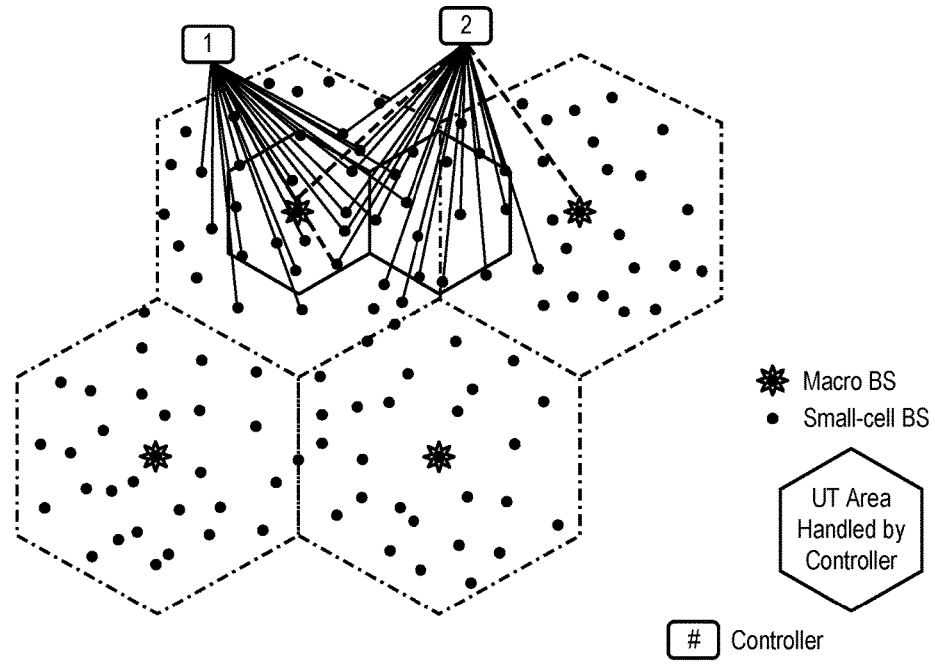
FIG. 1 illustrates an example of resource allocation across a wireless network by use of set of network controllers.

Embodiments of the invention include methods and apparatuses for load balancing, resource allocation and scheduling simultaneous user transmissions in single and multi-tier wireless networks involving tiers with cells of different sizes. Embodiments of the invention provide options for serving users via networks with large-array BSs, in which different users are served by their preferred BS (in, for example, cellular mode), or by their preferred clusters of BSs (in, for example, CoMP mode). According to one embodiment, transmission resources are efficiently allocated across the network over the OFDM plane for cellular and CoMP transmission across the user population. In particular, one embodiment of the invention exploits a particular form of CoMP, referred to as distributed MIMO, which not only allows harvesting CoMP gains for cell-edge users, but also is able to do so with simple operation and systematic resource allocation and load balancing. In one embodiment, a method for allocating user clusters resources uses a combination of disclosed operations that are performed at different time scales.

Embodiments of the invention allows serving users with cellular or CoMP transmission. Specifically, in one embodiment, transmission resources are allocated at each BS in the network for serving users in Massive MIMO transmission in cellular mode (i.e., by a single BS) and/or in distributed MIMO (CoMP) mode. In one embodiment, the mechanisms rely on a particular architecture in which over each transmission resource, users are served across the topology with from BSs of a given cluster size. In one embodiment, the mechanisms use knowledge of large-scale received-signal-power information between each user terminal and a subset of "nearby" BSs to determine what resources to allocate at a coarser time scale for serving each user in clusters of size 1 (cellular), 2, and so on, up to a maximum cluster size, as well as which cluster(s) of BS to serve the user in each case. Subsequently, scheduling mechanisms (disclosed herein) allocate transmission resources at a finer scale. In one embodiment, the goal of these scheduling mechanisms is to implement the coarser time-scale resource allocation.

Note that the terms "user," "user terminal," and "client" are used interchangeably throughout the disclosure.

Herein, a class of methods and apparatuses are disclosed, which allow efficient network-wide load balancing and scheduling over wireless heterogeneous networks with cellular and CoMP massive MIMO transmission. The architectures and associated techniques can be used for providing efficient and scalable operation over single- and multi-tier wireless networks. Special examples of these networks are small cells, macro cells or heterogeneous deployments.

Embodiments of the invention enable effective network-wide load balancing together with user association and scheduling by use of a combination of coarse and finer time resource allocation mechanisms.

Load balancing is performed and/or updated periodically, as user terminals move about and enter or exist in the system. In the description, however, the focus is on a single network-state instance, in order to concretely describe the load-balancing mechanisms associated with the invention. In this context, the method provides mechanisms for associating user terminals with clusters for transmission and for scheduling simultaneous transmissions of user-cluster association pairs. Although the disclosed mechanisms apply to given finite-size geographical area, they can be made readily scalable if used in combination with other methods such as disclosed, for example, in H. Papadopoulos and O. Bursalioglu, "Method and Apparatus for Scalable Load Balancing Across Wireless Heterogeneous MIMO Networks," patent application Ser. No. 14/738,565, filed Jun. 12, 2015.

Mechanisms are disclosed according to which a load balancing device allocates resources between user terminals and clusters of BSs for data transmission taking in to account user fairness and network performance. The coarser time-scale resource-allocations are then realized at a finer, scheduling, time scale, by use of disclosed scheduling mechanisms.

In one embodiment, the mechanism responsible for load balancing uses as input information indicative of the large-scale received power between users and nearby BSs, such as the large-scale fading characteristics between users and BSs (which change slowly over time). Methods disclosed herein also enable iterative and/or dynamic (adaptive) load balancing of resources across the network. In one embodiment, load balancing is performed by choosing allocation of activity fractions across user-cluster pairs, that is, by allocating fractions of resources to each combination of user terminal and cluster of BSs. On-line load-balancing methods that are updated from a given interval to the next interval are also direct extensions of the disclosed mechanisms.

In one embodiment, any activity fraction between a user and a cluster of BSs represents a "desired" fraction of resources that the network should allocate (at a macroscopic time-scale) to serve the user from the given cluster of BSs via distributed MIMO transmission. Embodiments of the invention also include mechanisms to turn these activity fractions into scheduling policies. These scheduling policies target scheduling pairs (user, cluster of serving BSs) at the desired activity fraction levels provided by the load balancer. In one embodiment, these scheduling policies consequently determine pilot dimensions that will be assigned to each scheduled user in each resource block the user is scheduled for transmission. Note that with the given distributed MIMO architectures, in one embodiment, a user is aware of the resource blocks (RBs) to which the user is scheduled as well as the pilot dimensions allocated to the user within the RBs to which the user is scheduled, but the user need not be aware of the cluster of BSs serving the user within any given RB.

Methods and apparatuses disclosed herein allow load balancing and network-wide optimization based on a broad range of fairness criteria. In addition, although embodiments of the invention are presented in the context of reciprocity-based massive MIMO, embodiments of the invention can also be applied with feedback-based MIMO techniques, with small or large-scale MIMO.

Embodiments of the invention have one or more of the following advantages with respect to the state-of-the-art load balancing and scheduling approaches:

1) Embodiments of the invention allow robust, and practical load balancing across multi-tier wireless networks with massive MIMO deployments not only with cellular but also Coordinated MultiPoint (CoMP) transmission.
2) Embodiments of the invention rely on the use of CoMP transmission, referred to herein as distributed MIMO, that requires user-data synchronization across different BSs, but does not require channel state information exchange between BSs.
3) Embodiments of the invention rely on load balancing mechanisms that partition the transmission resources across users and clusters of BS, so that users are served in their preferred mode (e.g., cellular or CoMP in one embodiment), in the form of activity fractions between each user and each BS or cluster of BSs. These activity-fraction allocations ensure network transmission resources are efficiently and fairly distributed at a macroscopic time scale across the user population.
4) Embodiments of the invention set forth scheduling architectures and mechanisms, which allocate transmission resources at the resource block level across the network, so as to ensure that the activity-fraction allocations provided by the load balancer are matched a macroscopic time scale.
5) In a static scenario, techniques described herein yield significant network-wide performance benefits with respect to their only-cellular massive MIMO counterparts.
6) Embodiments of the invention allow the use of different fairness criteria over different tiers, bands, or even BSs, thereby enabling interoperability among different vendor products.

Problems solved by one or more embodiments of this invention include the following:
1) Mechanisms for choosing preferred-association BSs (for cellular transmission) and/or preferred-association BS-clusters (for distributed MIMO transmission) for each user terminal.
2) Optimized allocation of the fractions of network transmission resources given to users for cellular and distributed MIMO transmission over networks with Massive MIMO small cells.
3) Scheduling policies: these policies allocate transmission resources at each BS at the resource block level to users for cellular Massive MIMO or distributed Massive MIMO transmission so as to realize the optimized resource-fraction allocations.
4) Methods for user association, resource allocation, and scheduling enabling harmonized use of cellular and distributed MIMO across a wireless network: disclosed methods enable flexible allocation of transmission resources across the network to users, and at the same allow optimizing the choice of transmission mode (cellular or distributed MIMO) and the serving BSs (one in the case of cellular, a cluster in the case of distributed MIMO) for each user terminal.

Embodiments of the invention include methods and apparatuses for balancing the load in a wireless HetNet while enabling a harmonized and optimized use of cellular and distributed Massive MIMO across the wireless network. Distributed MIMO is a particular form of CoMP, which does not require channel information exchange between different BSs. By serving cell-edge users from multiple nearby BSs, distributed MIMO can provide spectral efficiency benefits when serving the cell edge. Embodiments of the invention can be readily applied to perform load balancing over multi-tier networks with massive-MIMO small cells and are able to perform cellular and distributed MIMO transmission. Embodiments of the invention enable resource-efficient practical and dynamically adapted load balancing, together with user scheduling for reciprocity-based MU-MIMO cellular and distributed MIMO transmission.

Embodiments of the invention improve network operation for reciprocity-based cellular and distributed MU-MIMO over TDD single- and multi-tier deployments with large antenna arrays and large number of users. Embodiments of the invention allow load balancing across all tiers and all cells for cellular and distributed MIMO transmission, and can enable high multiplexing gains simultaneously for all users (whether at a cell center or the cell-edge) by fairly allocating transmission resources over all tiers and BS across the network.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Embodiments of this invention include mechanisms for allocating resources for cellular and distributed MIMO across a wireless network, which allow improving for each user terminal the following: (i) the choice of transmission mode (cellular or distributed MIMO); (ii) the choice of the serving BS in the case of cellular, and cluster of BSs in the case of distributed MIMO. In one embodiment, methods rely on the combination on the following to accomplish this over a given finite geographical area:

Mechanisms for resource allocation and load balancing, including methods for allocating fractions of the network transmission resources to users at a coarse (e.g., user association) time scale for cellular and distributed MIMO transmission.

Policies for scheduling user transmissions for cellular and distributed MIMO transmission at a finer (e.g., resource block) time scale, which realize the coarser time-scale resource allocations.

To simplify the exposition of the embodiments, in one embodiment, a "full buffer" scenario is assumed in which the network has data for all the users in the system. Without loss of generality and for ease of exposition, it is also assumed that the wireless system is a sufficiently "loaded" system, where the number of user terminals to be served (on average) per BS is much larger than the number of terminals that can be simultaneously served within each resource block by each BS.

It is assumed that the operator has chosen a fairness criterion for capturing the effect its allocation of transmission resources from BSs to user terminals has on the network-wide performance. This fairness criterion captures the user fairness objective employed by the network operator. In one embodiment, this fairness criterion comes from the class of α-fairness functions, which are well-known in the art. The a value is chosen by the operator and reflects the (inherently subjective) notion of fairness employed by the operator. For example, choosing the value 1 for α implies that proportional fair scheduling (PFS) is employed by the operator. In the case of cellular-only massive MIMO transmission and where each user is uniquely associated with a single BS, for instance, when using PFS, all users associated with a BS are allocated an equal portion of the scheduling transmission resources of the BS. However, the fraction can vary from BS to BS as the number of users associated with different BSs can vary. In contrast, selecting a larger than 1 means that the BS will provide more transmission resources to serve users with lower "peak rates" (worse channels) such as, e.g., "edge" users. In the extreme case $\alpha \to \infty$, referred to as "hard" (or max-min) fairness, the operator splits resources such that all users will be provided the same rate average-rate regardless of the channel quality. In this case, users with worse channel quality will be allocated more transmission resources by the BS so that all users get the same average-throughput.

The methods disclosed herein allocate resources for both cellular and distributed MIMO transmission in the context of the operator's choice of the fairness criterion. In one embodiment, resource allocation mechanisms are presented for an architecture according to which the network transmission resources are split into distinct chunks (e.g., contiguous subsets). In one embodiment, each chunk is used to serve user terminals with distributed MIMO transmission from clusters of BSs of a given fixed size (size 1 corresponding to cellular transmission). In one embodiment, each distinct chunk is used to serve user terminals with distributed MIMO transmission from clusters of BSs of a given subset of fixed cluster-sizes. In one embodiment, each distinct chunk is used to serve user terminals with distributed MIMO transmission from clusters of BSs of a given fixed size greater than one and cellular transmission.

In one embodiment, load balancing mechanism takes into account information indicative of the signal strength between each user (in a subset of users) to each of its nearby BSs. This information can be obtained in a variety of ways, as disclosed, for instance in, D. Bethanabhotla, O. Bursalioglu, H. Papadopoulos, and G. Caire, "Method and Apparatus for Scheduling, Load Balancing, and Pilot-Assignments in Reciprocity-Based MIMO Cellular Deployments," Provisional Patent Application No. 61/914,319, Filed December 2013 and PCT Application No. PCT/US2014/068323: H. Papadopoulos and O. Bursalioglu, "Method and Apparatus for Scalable Load Balancing Across Wireless Heterogeneous MIMO Networks," patent application Ser. No. 14/738,565, filed Jun. 12, 2015; and H. Papadopoulos and O. Y. Bursalioglu, "Method and Apparatus for User/Base-station Signaling and Association Achieving Load Balancing Across Wireless Multi-Band Heterogeneous Networks", patent application Ser. No. 14/980,781, filed Dec. 28, 2015. Load balancing mechanisms are disclosed, which, based on this information, allocate fractions of resources to each chunk, and fractions of resources within each chunk to (user, cluster of BSs) pairs. In one embodiment, these allocations do not in general specify scheduling information, as they are indicative of fractions of the total transmission resources that are to be allocated to user terminals and clusters of BSs for transmission at a coarser time-scale. In a practical implementation, these fractions of resource-allocations between user terminals and clusters of BSs may be re-updated every few seconds, while the splitting of resources across chunks may be reallocated at the same or at an even slower rate. In contrast, scheduling mechanisms may typically operate at time scales in the order of milliseconds or tens of milliseconds.

Note that the disclosed mechanisms can be used with heterogeneous networks with or without massive MIMO operation. Note that the proposed mechanisms do not require the use of heuristically "bias" associations towards small-cells as is done in conventional deployments. Indeed, this is implicitly performed via the systematic resource allocation mechanisms disclosed herein.

Although not described in detail herein, straightforward extensions of the presented mechanisms can readily enable the operator to provide differentiated service to its client terminals while at the same time balancing the load across the network and providing a harmonized allocation of resources for cellular and CoMP transmission.

In embodiments disclosed herein, it is assumed that resource allocation across the network is handled by the combination of network controllers as shown in FIG. 1, with each controller covering a geographical area (and where the geographical areas covered by each controller are overlapping). Referring to FIG. 1, two areas 101 and 102, each depicting the user terminals that the given controller, controllers 1 and 2 respectively, is serving. In one embodiment, each controller serves an area of user terminals via resources provided to it by each BS the controller shares an edge. Each controller is connected by an edge in FIG. 1 to a subset of small and macro BSs, which could potentially serve the user terminals in the geographical area served by the controller. Embodiments in the invention include mechanisms for the operation of one such controller. Specifically, mechanisms are disclosed which are a combination of resource allocation fractions at a coarser time scale and scheduling at a finer time scale, and allow serving users terminals in a network controller's geographical area using the transmission resources allocated to the controller by the BSs in its area.

To reduce the amount of nuisance notation throughout this disclosure, the disclosed mechanisms for one such controller working in "an isolated setting" are described, whereby the controller has available to it all the resources by the BSs in its area. Extensions to the general setting shown in FIG. 1 can be readily obtained by use of combining the methods presented herein with the scalable load-balancing methods in H. Papadopoulos and O. Bursalioglu, "Method and Apparatus for Scalable Load Balancing Across Wireless Heterogeneous MIMO Networks," patent application Ser. No. 14/738,565, filed Jun. 12, 2015. Similarly, in the context of operation over multiple bands and/or differentiated service, through which a user may simultaneously be served over different bands (e.g., carrier aggregation), embodiments involving straight-forward extensions of disclosed controller-entity operation can be used to ensure that users are properly served over multiple bands by harmonized cellular and CoMP transmission.

Figure 2:
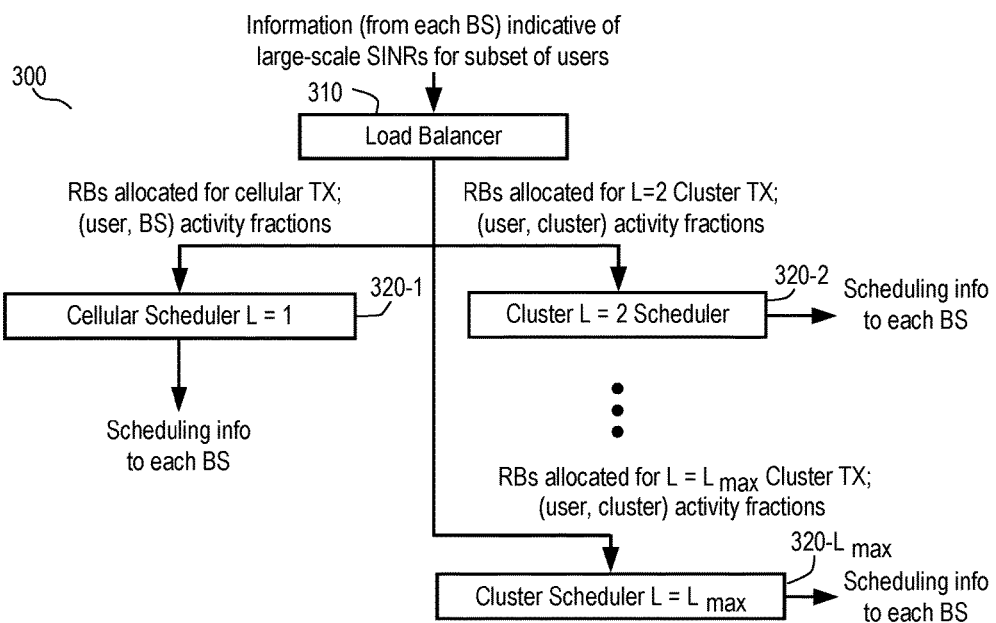
FIG. 2 is a flow diagram of a process for resource allocation performed by a load balancing controller across a cellular scheduler, and cluster scheduling modules serving users via distributed MIMO.

FIG. 2 shows a block diagram corresponding to one embodiment of a network resource allocation mechanism. Referring to FIG. 2, resource allocation is performed by load balancing controller 310 across cellular scheduler 320-1 and cluster scheduling modules 310-2, 320-3, . . . , 320-$L_{max}$ serving users via distributed MIMO. In one embodiment, cluster-L scheduler 320-L schedules each of its users from a user-dependent cluster of L BSs. More specifically, a load balancing unit 310 takes inputs from each BS unit that is indicative of large-scale receive power (or large scale SINR) in the downlink (DL) transmissions between each base station unit and individual user terminals. Load balancer unit 310 is coupled with a cellular scheduler unit 320-1, and possibly several cluster scheduler units 320-2, 320-3, . . . , 320-$L_{max}$. Load balancer 310 allocates fractions of resources among cellular scheduler unit 320-1, and cluster scheduler units 320-2, 320-3, . . . , 320-$L_{max}$. In one embodiment, load balancer 310 specifies to unit 320-L, the set of users that are to be served by Unit 320-L, the cluster of size L that should be used to serve each user served by unit 320-L, and the fraction of transmission resources that are to be allocated to the user out of the available transmission resources to unit 320-L (as allocated to unit 320-L by unit 310).

Figure 3:
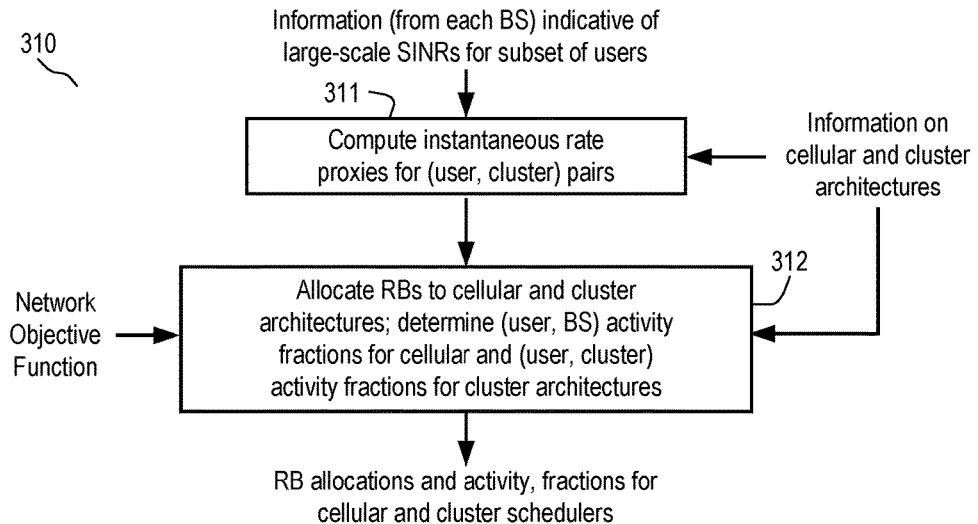
FIG. 3 is a data flow diagram of one embodiment of a process performed by a load balancing controller for load balancing.

FIG. 3 is a flow diagram of one embodiment of a load balancing process performed by load balancing unit 310. Referring to FIG. 3, load balancer 310 uses the information provided by each BS regarding the received signal power or SINR from a subset of user terminals and the BS to determine "proxy" values for the instantaneous rates that can be provided to each user when served in cellular mode by one or more BSs, or by different clusters of BS in distributed MIMO mode (processing block 311). This information is then used to allocate transmission resources (e.g., RBs) across cluster controllers to cellular and cluster architectures to serve users. The information is also used to determine which users are to be served by each scheduler unit of the form 320-L, which cluster of the cluster of size L should be used to serve and what fraction of the transmission resources of unit 320-L should be allocated to the user (processing block 312). The RB allocations and activity fractions for cellular and cluster schedulers are outputs.

Figure 6:
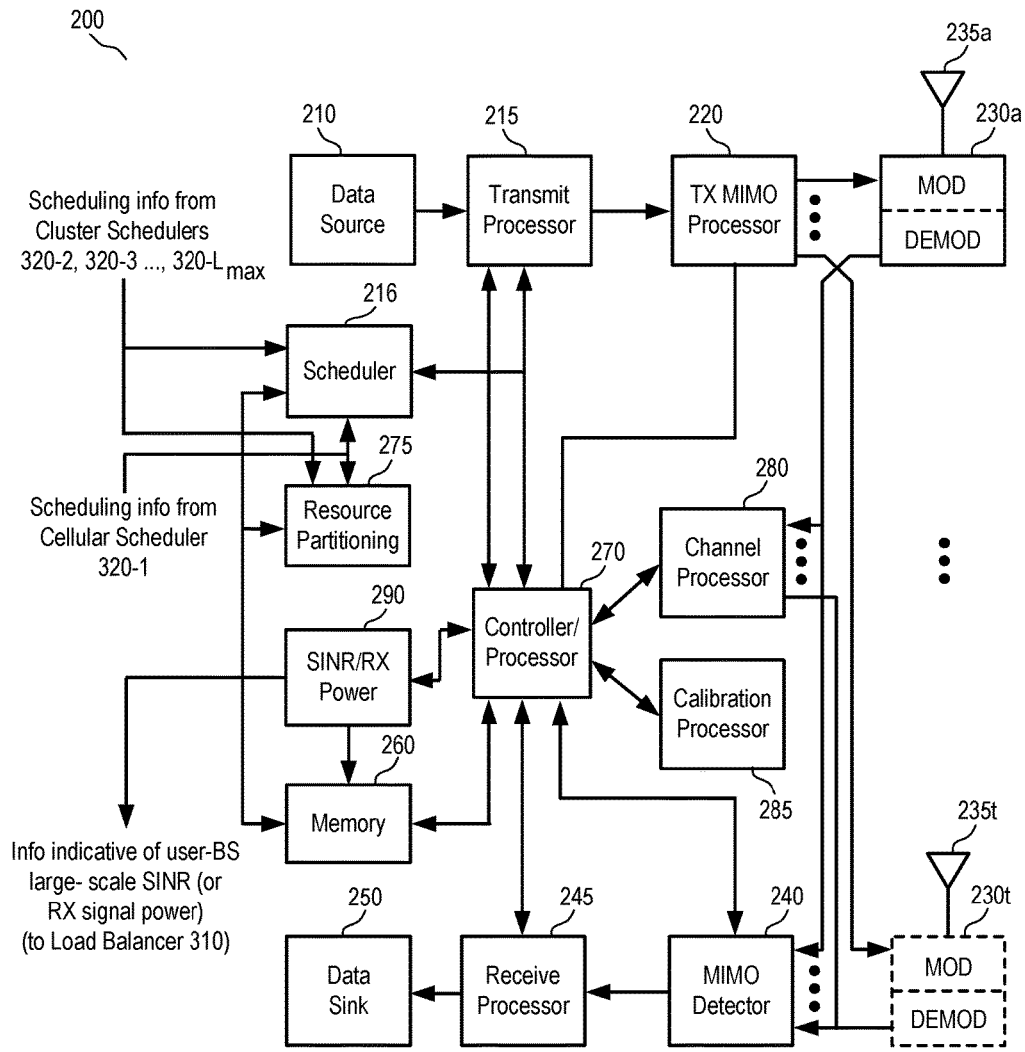
FIG. 6 is a block diagram of one embodiment of a base station.

FIG. 6 shows a block diagram of one embodiment of a BS 200. In one embodiment, the BS apparatus schedules transmissions to user terminals in cellular or distributed MIMO mode based on information provided by the cellular scheduler unit 320-1, and the cluster scheduler units 320-2, . . . , 320-$L_{max}$.

Referring to FIG. 6, BS 200 includes standard modules for MIMO wireless transmission. A transmit processor 215 at BS 200 receives data for one or more UTs from a data source 210, process the data for each UT and provides data symbols to all UTs. Processor 215 receives and processes control information from a controller/processor 270 and provides control symbols. Processor 270 also generates reference symbols for one or more reference signals. A transmit (TX) MIMO processor 220 performs precoding on the data symbols, the control symbols, and/or the reference symbols for each UT as well as for reference signals for antennas co-located at the same BS 200 or to other wireless entities such as other BSs, remote radio heads (RRHs), etc.

In one embodiment, processor 220 provides parallel output symbols streams to modulators, MODS (230a through 230t). Each modulator 230 further processes (e.g., convert to analog, amplify, filter, and upconvert) the output sample stream to obtain a downlink signal. The downlink signals from modulators 230a through 230t are transmitted via antennas 235a through 235t, respectively.

At BS 200, the uplink signals from various UT's or by other antennas, collocated at the same BS 200 or located at different BSs or other wireless entities are received by antennas 235a through 235t, demodulated by demodulators (DEMODs 230a-230t). The demodulated signals are detected by MIMO detector 240 and further processed by a receive processor 245 to obtain decoded data and control information sent by UTs and other wireless entities. Receive processor 245 receives detected signals from MIMO detector and provides decoded data to a data sink 250 and control information to the controller/processor 270. The demodulated signals output by DEMODs 230a through 230t are also provided to the channel processor 280 where uplink channel may be estimated and provided to the controller/processor 270.

BS 200 of FIG. 6 also includes a calibration-processing unit 285. In one embodiment, the calibration processor 285 exchanges control information with the controller/process unit 270, and calculates calibration values, which are used at controller/processor 270 together with UL channel estimation to construct downlink channel estimation. Downlink channel estimation is provided to TX MIMO Processor 220 for precoding. Processing at unit 285 involves both the signaling and data collection aspects of calibration as well as the relative calibration methods, which are based on the collected data, and, possibly additional parameters, including past relative calibration values for arbitrary subsets of the transmit antenna nodes at this and possibly other BSs.

BS 200 also includes a scheduling unit, scheduler 216. In one embodiment, scheduler 216 takes inputs from cellular scheduler unit 320-1 and cluster Scheduler units 320-2, 320-3, . . . , 320-$L_{max}$. Scheduler 216 exchanges scheduling information with transmit processor unit 215. According to this information, transmit processor 215 requests the data of the scheduled users from data source 210. Scheduler 216 also provides the information of which uplink channel estimates belong to which users to the channel processor 280. Scheduler 216 processes the information provided by cellular scheduler unit 320-1 and cluster scheduler units 320-2, 320-3, . . . , 320-$L_{max}$. In one embodiment, the information provided by cellular scheduler unit 320-1 and cluster scheduler units 320-2, 320-3, . . . , 320-$L_{max}$ includes activity fractions, various scheduling constraints, re-use constraints. In one embodiment, scheduler 216 also takes input from an additional optional resource partitioning unit 275. Unit 275 may take as inputs from cellular scheduler unit 320-1 and cluster scheduler units 320-2, 320-3, . . . , 320-$L_{max}$, and use that information to resolve scheduling assignments to be provided to scheduler 216. This may include operations involving potentially changes in the data traffic that may allow a BS to locally allocate additional resources to some of the user terminals it can serve.

In one embodiment, BS 200 also includes a unit 290, which determines information indicative of large-scale receive power (or large scale SINR) in the DL transmissions between the base station and individual user terminals. This information is provided as input to load balancing controller 310.

Figure 7:
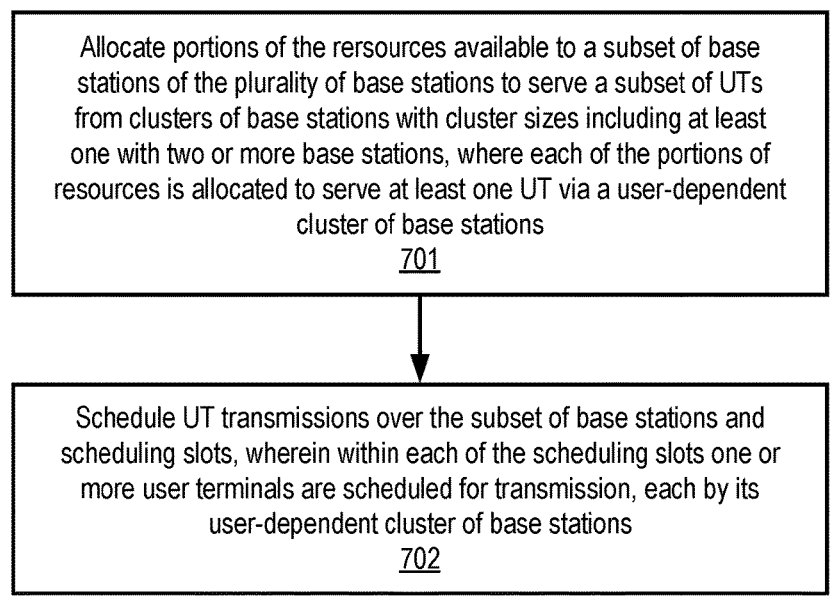
FIG. 7 is a flow diagram of one embodiment of a method for allocating resources over a wireless network.

FIG. 7 is a flow diagram of one embodiment of a method for allocating resources over a wireless network having a plurality of base stations for transmission to a plurality of user-terminals (UTs) and for scheduling simultaneous transmissions to the UTs, with each UT being served by a single base station or jointly by multiple base stations. The process is performed by processing logic that may comprise hardware (circuitry, dedicated logic, etc.), software (such as is run on a general purpose computer system or a dedicated machine), or a combination of both.

Referring to FIG. 7, the process begins by allocating portions of the resources available to a subset of base stations of the plurality of base stations to serve a subset of UTs from clusters of base stations with cluster sizes including at least one with two or more base stations, where each of the portions of resources allocated to serve one UT via a user-dependent cluster of base stations (processing block 701). Thus, allocating portions of the resources comprises performing at least one resource allocation to at least one subset of base stations with cluster sizes of 1 and greater than one. In one embodiment, the portions of resources are fractions of the resources.

In one embodiment, allocating portions of the resources comprises allocating portions of resources based on a network utility metric. In one embodiment, the portions of the resources are fractions of available resources and allocating the fractions of available resources is to increase the network utility metric.

After allocating resources, processing logic schedules UT transmissions over the subset of base stations and scheduling slots, wherein within each of the scheduling slots one or more user terminals are scheduled for transmission, each by its user-dependent cluster of base stations (processing block 702). In one embodiment, scheduling UT transmissions over the subset of base stations and scheduling slots comprises scheduling transmissions from each cluster of base stations to each user terminal at a fraction of resources allocated by a resource-allocation mechanism. In another embodiment, scheduling UT transmissions over the subset of base stations and scheduling slots comprises generating a schedule with scheduled transmissions to a user terminal from a first set of base stations being based on simultaneously transmitting identical coded data to the user terminal from each base station of the first set of base station using a precoded beam designed locally at said each base station based on channel state information between said each base station and user terminals scheduled for transmission from said each base station.

System Model

The resource allocation and scheduling architectures for cellular and distributed Massive MIMO disclosed herein are henceforth described in detail. Without loss of generality, the focus is on the following scenario involving J BSs/APs (the terms BS and AP are used herein interchangeably) serving K single antenna users, spread over a potentially very large geographical area. Users and BSs are indexed by the indices k and j, respectively, with k from the user set $\mathcal{K}=\{1, 2, \ldots, K\}$ and j in the BS/AP set $\mathcal{J}=\{1, 2, \ldots, J\}$. It is assumed that BSj has $M_j$ antennas and that $M_j \gg 1$.

In one embodiment, OFDM transmission resources are split into "slots", or resource blocks (RBs), with each slot/RB corresponding to a contiguous block of OFDM subcarriers and symbols. Although not necessary, a block-fading channel model is assumed where the channel coefficients remain constant within each RB/slot. Over a generic RB, $G_j$ denotes the $M_j \times K$ channel matrix between the BSj antennas and the K users, with the associated k-th user channel given by the k-th column, $g_{kj}=[g_{kj,1}\ g_{kj,2} \cdots g_{kj,M_j}]^T$. The channel between BS j and user k can be expressed as $g_{kj}=\sqrt{\beta_{kj}}h_{kj}$ with the slow-fading scalar $\beta_{kj}$ characterizing the combined effect of distance-based pathloss and the location-based shadowing, and the vector $h_{kj}=[h_{kj,1}\ h_{kj,2} \cdots h_{kj,M_j}]^T$ capturing fast fading. It is assumed each link experiences independent Rayleigh fading, i.e., the $h_{kj,i}$'s are i.i.d. $\mathcal{CN}(0,1)$ random variables, where $\mathcal{CN}(0,1)$ denotes a complex-valued circularly symmetric Gaussian random variable with zero mean and unit variance.

In one embodiment, TDD operation is assumed with reciprocity-based channel state information (CSI) acquisition. Hence, every BS antenna in the vicinity of user k can estimate its DL channel coefficient to user k from the uplink pilot transmitted by user k. This enables the training of large antenna arrays (e.g., $M_j \gg 1$) with training overhead proportional to the number of simultaneously served users. In contrast to feedback-based CSI acquisition, it also allows a user terminal to train multiple nearby BSs without incurring additional training overheads.

In one embodiment, that within each RB, a subset of users across the network are active, i.e., are scheduled for transmission. The active users transmit uplink (UL) pilots. Upon reception of these pilots from nearby BSs, the network obtains CSI (between terminals and nearby-BS antennas) and serves the users in the DL. In particular, the coded data for any given user served within a given RB is transmitted in the DL, either via a single BS (corresponding to cellular transmission), or via a cluster of nearby BSs, by use of a form of distributed MIMO transmission. Letting $P_j$ and $N_j=(t)$ denote the transmit power at BS j, and the number of user streams served by BS j in RB t, respectively, and assuming each BS allocates the same transmit power among all the streams it serves within RB t, the received signal at an active user k in RB t can be expressed in the following form $$y_k = \sum_{j \in \mathcal{C}} \sqrt{\frac{P_j}{N_j}} g_{kj}^H f_{kj} s_k + \sum_{j \in \mathcal{C}_u \in \mathcal{U}_j-\{k\}} \sqrt{\frac{P_j}{N_j}} g_{kj}^H f_{uj} s_u + \sum_{\ell \in \mathcal{J}/\mathcal{C}} \sum_{u \in \mathcal{U}_\ell} \sqrt{\frac{P_\ell}{N_\ell}} g_{k\ell}^H f_{u\ell} s_u + w_k \quad \text{(Equation 1)}$$

where $\mathcal{C}$ denotes the cluster (set) of BSs serving user k in RB t, $s_u$ denotes the unit-power stream for user u, $f_{uj}$ denotes the unit-norm precoding vector for user u at BS j, and $w_k$ is thermal noise at the receiver with i.i.d. $\mathcal{CN}(0,1)$ samples.

The choice of distributed MIMO vs. cellular MIMO transmission is meant to allow serving each user with its preferred transmission mode. Different users prefer different transmission modes, with cell-center users preferring cellular transmission while, cell-edge users preferring cluster transmission. In one embodiment, the aim is for a harmonized use of cellular and cluster MIMO transmission, in which network resources are allocated among users for cellular and cluster-BS transmission so as to improve network-wide performance.

Cellular Massive MIMO Load Balancing

In setting the stage for the mechanisms disclosed herein, it is worth considering load balancing and scheduling in the context of cellular massive MIMO transmission. Letting $S_j$ denote the (predefined) number of DL data streams that BS j can transmit on any given slot considers cellular HetNet operation in the massive MIMO regime, whereby $S_j \gg M_j$. Assuming that small-scale Rayleigh fading obeys some mild assumptions, for a given set of large-scale channel coefficients between users and BSs, the achievable user instantaneous rates, $R_{kj}(t)$, can be predicted a priori. In particular, there exist deterministic quantities $\{r_{kj}\}$ such that, $R_{kj}(t) \to r_{kj}$ almost surely for all $k \in \mathcal{U}_j$ and $j \in \mathcal{J}$ as $S_j, M_j \to \infty$ with fixed spatial load $S_j/M_j = v_j$. Furthermore, this "almost surely" convergence is very fast with respect to the $M_j$'s.

Furthermore, $r_{kj}$ is a function of system parameters but is independent of the user-cell association and of the other scheduled users. As a result, the long-term averaged throughput for user k can be expressed as $$r_k = \sum_{j \in \mathcal{J}} x_{kj} r_{kj}, \text{ for all } k \in \mathcal{U} \qquad \text{(Equation 2)}$$

where $x_{kj} = \lim_{T \to \infty} |\{t; k \in \mathcal{S}_j(t)\}|/T$ denotes the activity fraction of user k from BS j, that is, the fraction of slots over which user k is served by BS j.

In summary, advantages of the approach for cellular massive MIMO are as follows:
A. The $r_{kj}$ are accurate proxies for instantaneous user rates.
B. User throughputs depend on activity fractions, via (Equation 2).
C. The (combinatorial) user-cell association problem is recast as a (convex) network utility maximization (NUM) problem with respect to the variables $\{\alpha_{kj}\}$'s subject to transmission resource constraints.
D. For any set of activity fractions that does not violate any BS resource constraints, there exists a scheduling policy that realizes these activity fractions.

Distributed Massive MIMO in Accordance with Various Embodiments

The mechanisms disclosed herein also enable (A)-(D) above, for a particular form of harmonized use of cellular and cluster transmission. The BS-cluster transmission methods considered herein amount to a form of distributed MIMO, which allows predicting the limiting user-cluster peak rates, as in (A) above. As a result, NUM problems similar to (C) can be cast and mechanisms can be created that solve them. At the same time, as illustrated in a subsequent section herein, unlike the cellular case, item (D) is no longer always possible when cluster-based transmission is considered. Nevertheless, mechanisms are disclosed herein, which generate scheduling policies that approximate the activity fractions provided by the solution of the NUM.

Note that, although, it is possible to predict the user rates in clustered, or "network" MIMO transmission to a set of users, the rate any given user receives is also in general a function of the other scheduled users' (large-scale) channel coefficients to the different BSs in the cluster. This coupling of user rates to the scheduling sets makes predicting a priori the effect of different schedulers and the rates these provide to users very difficult.

Mechanisms described herein are very effective if used in conjunction with a particular type of distributed MIMO transmission. In one embodiment, for this type of distributed MIMO transmission, the user rates do not depend on the other user large-scale channel coefficients; they only depend on the large-scale channel coefficients of the user of interest and the BSs used in the clustered transmission. In particular, at least some mechanisms considered herein best work with a class of "admissible" distributed MIMO schemes, which arise as a cluster extension of a given cellular scheme.

Definition 1: Admissible Distributed MIMO Schemes

In one embodiment, an admissible scheme schedules users for transmission on a sequence of RBs, and, on each RB, the scheme satisfies the following:
(i) All the users served by a given BS j are served in clusters of the same size L for some $L \geq 1$.
(ii) BS j serves at most $S_j(L)$ users, for some fixed $S_j(L)$, satisfying $S_j \leq S_j(L) \leq L \cdot S_j$.
(iii) The user beams (i.e., the precoding vectors) at BS j are designed as if BS j were engaging in cellular MU-MIMO transmission over all the users it serves.
(iv) All BSs serving a user terminal transmit the same coded user stream. Each BS serving the user terminal transmits this stream on a beam that is (independently and locally) designed for the user at that BS.
(v) $M_j \gg S_j(L)$, for all L and j considered.

Inherently, the design of the precoders in (iii) only requires local CSI; that is, BS j only needs the channels between the users it serves and its own antennas in order to generate the beams for the users it serves. For instance, in the case that distributed MIMO is based on LZFBF in step (iii), the user beam for each user served by BS j is chosen within the null space of the all other user channels (served by BS j) and in particular in the direction of the unit-norm vector that maximizes the received signal strength at the desired user from BS j.

Finally, note that serving $S_j(L) > S_j$ for $L > 1$ does not necessarily require additional UL pilot overheads (with respect cellular L=1 case). Indeed, a UL pilot transmission from a user provides channel estimates to all nearby antennas whether these are in the same or different locations.

Note that, due to (i), when a user is served over a given RB by a set of L BSs in cluster transmission, any user served by each of these L BSs in the same RB is served by a cluster of L BSs. Different users served by the j-th BS, however, need not necessarily be served by the same cluster of BSs, even within the same RB.

TABLE 1

Example showing RBs enabled by distributed MIMO

| Slot/RB | | BS 1 | BS2 | BS3 | BS4 |
|---|---|---|---|---|---|
| #1 | Cluster Size | 1 | 1 | 1 | 1 |
| | User Power | 1/2 | 1/2 | 1/2 | 1/2 |
| | Serve Users | 1, 2 | 3, 4 | 5, 6 | 7, 8 |
| #2 | Cluster Size | 2 | 2 | 2 | 2 |
| | User Power | 1/3 | 1/3 | 1/3 | 1/3 |
| | Serve Users | 1, 2, 3 | 1, 2, 3 | 4, 5, 6 | 4, 5, 6 |
| #3 | Cluster Size | 2 | 2 | 2 | 2 |
| | User Power | 1/3 | 1/3 | 1/3 | 1/3 |
| | Serve Users | 1, 2, 3 | 1, 4, 5 | 2, 4, 6 | 3, 5, 6 |
| #4 | Cluster Size | 2 | 2 | 1 | 1 |
| | User Power | 1/3 | 1/3 | 1/2 | 1/2 |
| | Serve Users | 1, 2, 3 | 1, 2, 3 | 4, 5 | 6, 7 |

Table 1 provides an example of a distributed MIMO scheme that is admissible in the sense of Definition 1, involving clusters of size 1 (cellular transmission) and size 2. In the example, 4 BSs are considered, and (for simplicity of exposition) it is assumed that $S_j(1) = S_j = 2$, while $S_j(2) = 3$ and $P_j = 1$. As Table 1 reveals, in RB #1, all BSs engage in cellular transmission, and each BS allocates power ½ to each user it serves. Assuming orthogonal pilots are allocated per user, (at least) 8 resource dimensions need to be allocated for UL pilots in order to enable this cellular transmission mode (one pilot dimension per user). In RB #2, pairs of BSs perform distributed MIMO transmission, each BS pair to a triplet of users. To enable the distributed MIMO transmission in RB #2, only 6 UL pilot dimensions are needed (one for each of the 6 users served). RBs #3 and #4 provide additional, more interesting, modes of operation that fall within the family of admissible distributed MIMO schemes of Definition 1. Much like in RB #2, in RB #3, each BS also serves 3 users in clusters of size 2. However, as a review of the table entries reveals, no user is served by the same cluster of BSs. Finally, in RB #4, BSs 1-2 serve users in clusters of size 2, while BSs 3 and 4 serve users in cellular transmission mode.

Letting $S\mathcal{C}$ (t) denote the set of active users served by cluster $\mathcal{C}$ in RB t, for the example in Table 1 we have, $S_{\{1\}}(1)=\{1,2\}$, $S_{\{2\}}(1)=\{3,4\}$, $S_{\{3\}}(1)=\{5,6\}$, $S_{\{4\}}(1)=\{7,8\}$ and $S\mathcal{C}$ (t) being empty for all other clusters $\mathcal{C}$. Inspection of the scheduled users in RB #2 reveals that $S_{\{1,2\}}(2)=\{1,2,3\}$, $S_{\{3,4\}}(2)=\{4,5,6\}$, and $S\mathcal{C}$ (t) being empty for all other clusters $\mathcal{C}$. Inspection of the scheduled users in RB #3 reveals $|S\mathcal{C}(3)|=1$ for all $\mathcal{C}$ for which $|\mathcal{C}|=2$, while $|S\mathcal{C}(3)|=0$ for all $\mathcal{C}$ for which $|\mathcal{C}|=1$.

Instantaneous Rates and Net Throughputs with Distributed Massive MIMO

Using distributed Massive MIMO schemes, such as the ones in Definition 1, allows developing accurate proxy expressions for the instantaneous user rates and for the scheduled user throughputs that are provided by any given scheduling policies enabling distributed MIMO transmission based on either LZFBF or CBF. These expressions can be viewed as cluster-extensions of the ones developed for the cellular Massive MIMO setting in D. Bethanabhotla, O. Bursalioglu, H. Papadopoulos, and G. Caire, "Method and Apparatus for Scheduling, Load Balancing, and Pilot-Assignments in Reciprocity-Based MIMO Cellular Deployments," Provisional Patent Application No. 61/914,319, filed December 2013 and PCT Application No. PCT/US2014/068323. To see this, consider a scheduling policy on slots t with $1 \le t \le T$ and assume that all the large-scale coefficients stay fixed within this period (this is only for convenience; all the disclosed mechanisms can be applied regardless). Such a scheduling policy can be described in terms of the scheduling sets $\{S\mathcal{C}$ (t); for all $\mathcal{C}$ and for all t with $1 \le t \le T\}$.

For the distributed MIMO architectures disclosed herein (and assuming large arrays at each BS), expressions can be obtained, relating a user's throughput to the instantaneous rates the user received from the clusters it is served and the associated user activity fractions from the scheduling policy. In the limit $T \to \infty$ the net throughout of user k can be expressed as $$r_k = \sum_C x_{kC} r_{kC}, \text{ for all } k \in \mathcal{U} \quad \text{(Equation 3)}$$

The quantity $x_k\mathcal{C}$ can be viewed as the activity fraction of user k with respect to cluster $\mathcal{C}$ and is given by $$x_{kC} = \lim_{T \to \infty} \frac{|\{1 \le t \le T; k \in S_C(t)\}|}{T}$$

The quantity $r_k\mathcal{C}$ is a proxy for the instantaneous (or, "peak") rate user k receives from cluster $\mathcal{C}$ based on (Equation 1), over the RBs for which cluster $\mathcal{C}$ is serving user k. Note that convergence to the limiting expressions of interest is very quick in T.

For the case that the distributed MIMO transmission is based on cellular LZFBF it can be shown that $$r_{kC} = \log_2\left(1 + \frac{\sum_{j \in C} \sum_{\ell \in C} \sqrt{P_j P_\ell \beta_{kj} \beta_{k\ell} b_j(|C|) b_\ell(|C|)}}{1 + \sum_{\ell \notin C} P_\ell \beta_{k\ell}}\right) \quad \text{(Equation 4)}$$

where $$b_j(L) = \frac{M_j - S_j(L) + 1}{S_j(L)}$$

The Expression in (Equation 4) assumes that for all j in cluster C, BS j serves the maximum possible $S_j(L)$ users, giving each user a $1/S_j(L)$ fraction of its power. In the case that fewer users are served by one of the BSs, the LHS in (Equation 4) represents an achievable (lower-bound) rate.

Similarly, for the case that the distributed MIMO transmission is based on CBF, we have $$r_{kC} = \log_2\left(1 + \frac{\sum_{j \in C} \sum_{\ell \in C} \sqrt{\frac{P_j P_\ell \beta_{kj} \beta_{k\ell} M_j M_\ell}{S_j(|C|) S_\ell(|C|)}}}{1 + I_{kC} + \sum_{\ell \notin C} P_\ell \beta_{k\ell}}\right) \quad \text{(Equation 5)}$$

where $$I_{kC} = \sum_{j \in C} \frac{S_j(|C|) - 1}{S_j(|C|)} P_j \beta_{kj}$$

captures intra-cluster interference.

Embodiments for Load Balancing and Resource Allocation Across User Terminals and BSs for Cellular and Distributed MIMO In one embodiment, the mechanisms exploit a reformulation of the user-cluster association and resource allocation problem as a NUM problem. This reformulation is based on the fact that for the distributed MIMO transmission schemes of Definition 1, the throughput $r_k$ delivered to user k by a scheduling policy is captured by the set of the user's scheduled activity fractions $\{x_k\mathcal{C}\}$ and corresponding peak user-rates via (Equation 3). The disclosed mechanisms look at the problem of user-cluster association in terms of allocating such sets of activity fractions $\{x_k\mathcal{C}\}$ across all users, so as to improve a network-wide utility function capturing the operator's notion of (inherently subjective) fairness.

In one embodiment, the mechanisms rely on restricting the domain of scheduling options in order to obtain architectures and solutions that are of practical interest. First, the architectures allow users to be served by cluster sizes $L \in \{1, 2, \ldots, L_{max}\}$ for some appropriately chosen maximum cluster size $L_{max}$. The choice of Lmax is a design choice. In one embodiment, it depends on the average number of nearby BS arrays that users typically see but also on the complexity that can be afforded. In one embodiment, the disclosed mechanisms are applied on the following uniform cluster-size architectures:

Definition 2: Uniform Cluster-Size Architecture (UCS)

A scheme that falls within the class of Definition 1 is a UCS architecture, if $\lambda_L \ge 0$ fraction of the RBs is allocated to size L, for each $L \in \{1, 2, \ldots, L_{max}\}$, and if within any RB that is part of the $\lambda_L$ fraction the following are satisfied:

(i) Each scheduled user is served by a (user-dependent) cluster of L BSs;

(ii) For each j∈J, BS j does not serve more than $S_j(L)$ user beams.

In the UCS architecture, user transmissions from clusters of different sizes are scheduled on non-overlapping sets of RBs across the network. In the context of the example of Table such an admissible distributed MIMO architecture enables scheduling policies that schedule RBs of the type #1, #2, and #3 but not of the type of RB #4.

In one embodiment, the mechanisms consider the allocation of $\{x_k\mathcal{C}\}$'s subject to the UCS architecture of Definition 2, so as to maximize a utility function of the form $\Sigma_k U(r_k)$, with $r_k$ in the form of (Equation 3). The function $U(\cdot)$ is typically a strictly concave monotonically increasing function and captures a notion of "fairness". In one embodiment, the function $U(\ )$ is from the class of $\alpha$-fairness functions for some $\alpha \geq 0$. For instance, proportional fairness is obtained, if $\alpha$ is chosen equal to 1. Also in the case $\alpha \to \infty$, the "hard" fairness criterion is obtained, whereby the objective function to be maximized becomes the minimum among all the provided user rates.

In one embodiment, load balancing unit 310 solves the following convex optimization problem:

$$\underset{\lambda_L, x_{kC}}{\text{maximize}} \sum_{k \in \mathcal{U}} U\left(\sum_{C: |C| \leq L_{max}} x_{kC} r_{kC}\right) \quad \text{(Equation 6a)}$$

$$\text{subject to} \sum_{\substack{C: j \in C \\ |C|=L}} \sum_{k \in \mathcal{U}} x_{kC} \leq \lambda_L S_j(L), \quad \text{(Equation 6b)}$$

$\forall j \in \mathcal{J}$,
$\forall L \leq L_{max}$ $$\sum_{C: |C|=L} x_{kC} \leq \lambda_L, \quad \text{(Equation 6c)}$$

$\forall k \in \mathcal{U}$,
$\forall L \leq L_{max}$ $$x_{kC} \geq 0, \quad \text{(Equation 6d)}$$

$\forall k \in \mathcal{U}$,
$\forall C$ with $|C| \leq L_{max}$ $$\sum_{L=1}^{L_{max}} \lambda_L \leq 1 \quad \text{(Equation 6e)}$$

$$\lambda_L \geq 0, \quad \text{(Equation 6f)}$$
$\forall L \leq L_{max}$

The inequality corresponding to a given j and a given L value in (Equation 6b) signifies that the sum of the user activity fractions of all the users served in clusters of size L by BS j cannot exceed the product of the fraction of RBs available at BS j for serving users in clusters of size L and the maximum number of (cluster-size L) beams that can be spatially multiplexed by BS j. The inequality corresponding to a given k and a given L value in (Equation 6c) signifies that the fraction of RBs over which user k is served in clusters of size L cannot exceed the fraction of RBs allocated for serving users in clusters of size L. Note that, for the case $L_{max}=1$, the NUM problem described by the set (Equation 6a)-(Equation 6f) specializes to the cellular massive-MIMO architecture NUM problem, which is a convex problem. It is easy to check that the problem described by the set (Equation 6a)-(Equation 6f) is also a convex optimization problem in the general case of interest involving distributed MIMO transmission, and whereby $L_{max}>1$. As such, it can be solved by standard convex solvers, but also by special purpose solvers. In particular, straightforward extensions of the dual sub-gradient algorithm used in D. Bethanabhotla, O. Y. Bursalioglu, H. C. Papadopoulos, and G. Caire, "Optimal user-cell association for massive MIMO wireless networks," submitted to IEEE Trans. Wireless Comm., 2014, available at arXiv: http://arxiv.org/abs/1407.6731 for the cellular case can be implemented (as part of load balancer unit 310) to provide solutions for the case of interest, involving distributed MIMO and cellular transmission.

Embodiments for Scheduling Cellular and Distributed MIMO

Next, embodiments of scheduler units 320-L for the UCS architecture of Definition 2 are disclosed. These embodiments disclose mechanisms that can realize the resource allocations provided by the load balancer unit 310. In one embodiment, the resource allocations provided by the load balancer unit 310 correspond to the activity fractions $\{x_k\mathcal{C}\}$ provided by load balancer unit 310 by solving to the convex NUM problem described the set (Equation 6a)-(Equation 6f). Subsequently, mechanisms are disclosed for the set of scheduler units 320-L that generate scheduling policies and result in activity fractions closely matching $\{x_k\mathcal{C}\}$, i.e., closely matching the solution of the NUM described the set (Equation 6a)-(Equation 6f). The scheduling policies disclosed herein are feasible in the following sense:

Definition 3: Feasible Schedule

A scheduling policy $\{\mathcal{S}\,\mathcal{C}\,(t);\ \forall\mathcal{C}\ \text{with}\ |\mathcal{C}| \leq L_{max},\ \forall t \in \{1, 2, \ldots, T\}\}$ is feasible with respect to the UCS architecture of Definition 2, if it satisfies the following:

(i) For each t, the policy associates with RB t a single cluster size, L(t), for some $L(t) \leq L_{max}$; that is, for each set $\mathcal{C}$ for which $\mathcal{S}\,\mathcal{C}\,(t)$ is non-empty, we have $|\mathcal{C}|=L(t)$.

(ii) For each t, each user is served by at most one cluster; i.e., $\Sigma\mathcal{C}\ 1\{k \in \mathcal{S}\,\mathcal{C}\,(t)\} \leq 1$ for all k.

(iii) For each t, and for each $j \in \mathcal{J}$, BS j serves at most $S_j(L(t))$ users; that is, $|\cup \mathcal{C}_{:\ j \in}\mathcal{C}\ \mathcal{S}\,\mathcal{C}\,(t)| \leq S_j(L(t))$.

It can be readily verified that any schedule that is feasible (in the sense of Definition 3) yields $\{x_k\mathcal{C}\}$ and $\{\lambda_L\}$'s that satisfy the set of constraints (Equation 6b)-(Equation 6f). However, the reverse need not be necessarily true. Indeed, there exist $\{x_k\mathcal{C}\}$ and $\{\lambda_L\}$ sets, which satisfy the constraints (Equation 6b)-(Equation 6f), but for which no feasible schedule (in the sense of Definition 3) exists. For instance, for a network of J=3 BSs, with $L_{max}=2$ and $S_j(2)=3$ for all j, no feasible schedule exists that yields a set of $\{x_k\mathcal{C}\}$ with $\lambda_2>0$, for which (Equation 6b) is satisfied with equality for all j and L=2. This is because it is not possible to simultaneously schedule $S_j(2)=3$ user beams at all three BSs: at best two BSs can schedule 3 user beams, while the 3rd would necessarily schedule at most 2 user beams (i.e., the three BSs would schedule a total of 4 users, each receiving beams from a pair of BSs). Clearly, for any feasible schedule, the sum of the Inequalities in (Equation 6b) over all j for L=2 would have to yield a strict inequality in this case, as the sum over all j of the LHS in (Equation 6b) for L=2 is upper bounded by eight-ninths of the corresponding RHS.

As a result, in general, the solution to the NUM given by (Equation 6a)-(Equation 6f) provides an upper bound on the network performance achievable by any feasible schedule. Although a feasible schedule realizing exactly the solution to (Equation 6a)-(Equation 6f) may not exist, as described next, scheduling policies can be developed that yield performance close to the one provided by the $\{x_k\mathcal{C}\}$'s that are the solution of (Equation 6a)-(Equation 6f).

Scheduling Embodiments for Distributed MIMO Based on Virtual Queues

Empirical evidence reveals that, in a "loaded" network, most users are uniquely associated to a single cluster per cluster size, i.e., for most users, the solution to the NUM problem (Equation 6a)-(Equation 6f) yields a single nonzero $\{x_k\mathcal{C}\}$ among all clusters $\mathcal{C}$ with the same $|\mathcal{C}|$. As a result, in the practical settings of interest, the number of fractional users, that is, the number of users that are allocated non-zero activity fractions to multiple clusters of the same size is small.

Since the number of fractional users per cluster size is limited, in one embodiment, the optimal activity fractions $\{x_k\mathcal{C}\}$ that are returned by load balancer unit 310 are first approximated by unique-association activity fractions $\{\tilde{x}_k\mathcal{C}\}$. For each cluster size L, and for each k user that has at least one nonzero activity fraction to a cluster of size L, let $\mathcal{C}^* = \mathcal{C}^*(k)$ denote the cluster among all clusters of size L for which $x_k\mathcal{C}$ is the largest. For all clusters $\mathcal{C}$ with the same $|\mathcal{C}|=L$, we set $$\tilde{x}_{k\mathcal{C}} = \begin{cases} x_{k\mathcal{C}} & \text{if } \mathcal{C} = \mathcal{C}^*(k) \\ 0 & \text{otherwise} \end{cases}$$

Letting $\mathcal{U}\mathcal{C}$ denote the users for which $\tilde{x}_k\mathcal{C} > 0$, provides $\mathcal{U}\mathcal{C} \cap \mathcal{U}\mathcal{C}' = \emptyset$ for all $\mathcal{C} \neq \mathcal{C}'$ for which $|\mathcal{C}|=|\mathcal{C}'|$. Also let $$\mathcal{U}^L = \bigcup_{\mathcal{C}: |\mathcal{C}|=L} \mathcal{U}_\mathcal{C}$$

denote the set of users that receive non-zero activity fractions from clusters of size L and remark that the unique cluster for which $\tilde{x}_k\mathcal{C}$ is nonzero is given by $\mathcal{C}^* = \mathcal{C}^*(k)$.

In one embodiment, the scheduling policies for the UCS architecture comprise L parallel schedulers, 320-1, 320-2, ..., 320-Lmax, that is one scheduler per cluster size $L \in \{1, 2, \ldots, L_{max}\}$, as shown in FIG. 2.

Without loss of generality, the focus is on a fixed but arbitrary cluster size L>1 (the cellular case is much simpler and can be covered by use of the schedulers presented in D. Bethanabhotla, O. Bursalioglu, H. Papadopoulos, and G. Caire, "Method and Apparatus for Scheduling, Load Balancing, and Pilot-Assignments in Reciprocity-Based MIMO Cellular Deployments," Provisional Patent Application No. 61/914,319, filed December 2013 and PCT Application No. PCT/US2014/068323). Assuming a fixed but arbitrary non-zero fraction $\lambda_L$ of RBs has been allocated to serving clusters of size L, a method for scheduling users over the RBs dedicated to serving users in clusters of size L is described below.

In one embodiment, the goal of assigning to user k a fraction of RBs close to the desired fraction $\alpha_k = \tilde{x}_k\mathcal{C}_*/\lambda_L$ is realized by use of a max-min scheduling policy based on virtual queues (VQs) and where user k receives "reward"/rate $\tilde{R}_k = 1/\alpha_k$ when user k is scheduled for transmission over cluster $\mathcal{C}^*(k)$ i.e., when $k \in \mathcal{S}\mathcal{C}_{*(k)}(t)$, and subject to the constraints $|\cup\mathcal{C}_{,j\in}\mathcal{C}\mathcal{S}\mathcal{C}(t)| \leq S_j(L)$. The cluster-size L scheduler performs at each t a weighted sum-rate maximization (WSRM)

$$\underset{\hat{\mathcal{U}} \subseteq \mathcal{U}^{(L)}}{\text{maximize}} \sum_{k \in \hat{\mathcal{U}}} Q_k(t)\tilde{R}_k \quad \text{(Equation 7a)}$$

$$\text{subject to} \sum_{k \in \hat{\mathcal{U}}} 1\{j \in C^*(k)\} \leq S_j(L), \forall j \in \mathcal{J} \quad \text{(Equation 7b)}$$

where the weight of user k at time t, $Q_k(t)$, is the virtual queue length for user k at time t. In the case of max-min fairness, $Q_k(t)$ is updated as follows:

$$Q_k(t+1) = \max\{0, Q_k(t) - \tilde{R}_k(t)\} + A_k(t), \quad \text{(Equation 7c)}$$

$$\tilde{R}_k(t) = \begin{cases} \tilde{R}_k & \text{if user } k \text{ is scheduled at time } t \\ 0 & \text{otherwise} \end{cases}, \quad \text{(Equation 7d)}$$

$$A_k(t) = \begin{cases} A_{max} & \text{if } V > \Sigma_k Q_k(t) \\ 0 & \text{otherwise} \end{cases}, \quad \text{(Equation 7e)}$$

with $A_{max}$ and V chosen sufficiently large. Note that, in the absence of the constraints in (Equation 7b), the max-min scheduler solving (Equation 7a) schedules user k the desired fraction of RBs, $\alpha_k = \tilde{x}_k\mathcal{C}_*/\lambda_L$ (truncated/unique-association approximation of what is returned by load balancer unit 310).

Figure 4:
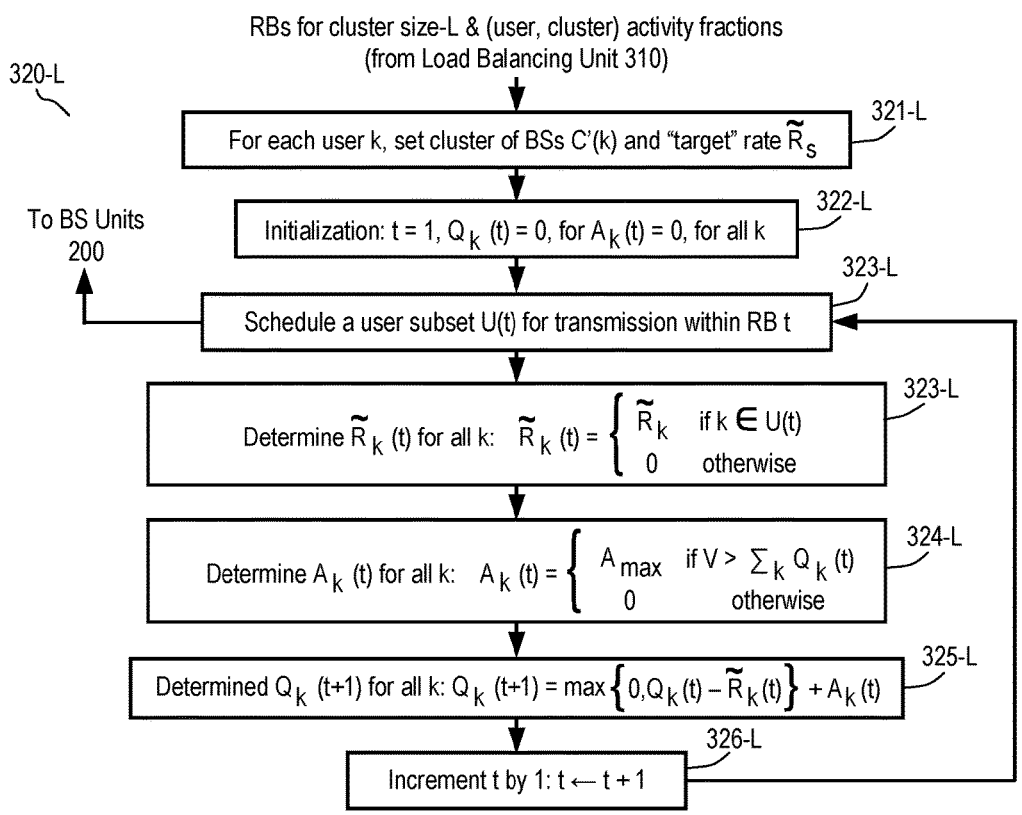
FIG. 4 is a data flow diagram of one embodiment of a process for scheduling performed at cluster scheduler unit.

FIG. 4 shows a flow diagram of one embodiment of a process for performing scheduling. In one embodiment, the scheduling processing includes the operations (Equation 7a)-(Equation 7d) performed within the scheduler unit 320-L scheduling clusters of transmissions of cluster size L. Using the $\{x_k\mathcal{C}\}$ fractions provided by load balancing unit 310, a unique association cluster $\mathcal{C}^*(k)$ and a corresponding target rate $\tilde{R}_k$ for the max-min scheduler is computed for each user k (operation 321-L). After the virtual-queue states are initialized (operation 322-L), users are scheduled for transmission by unit 330-L. Subsequently, the virtual queue states are updated (operations 323-L 324-L and 325-L), the slot index t is incremented by one and the procedure is repeated.

Figure 5:
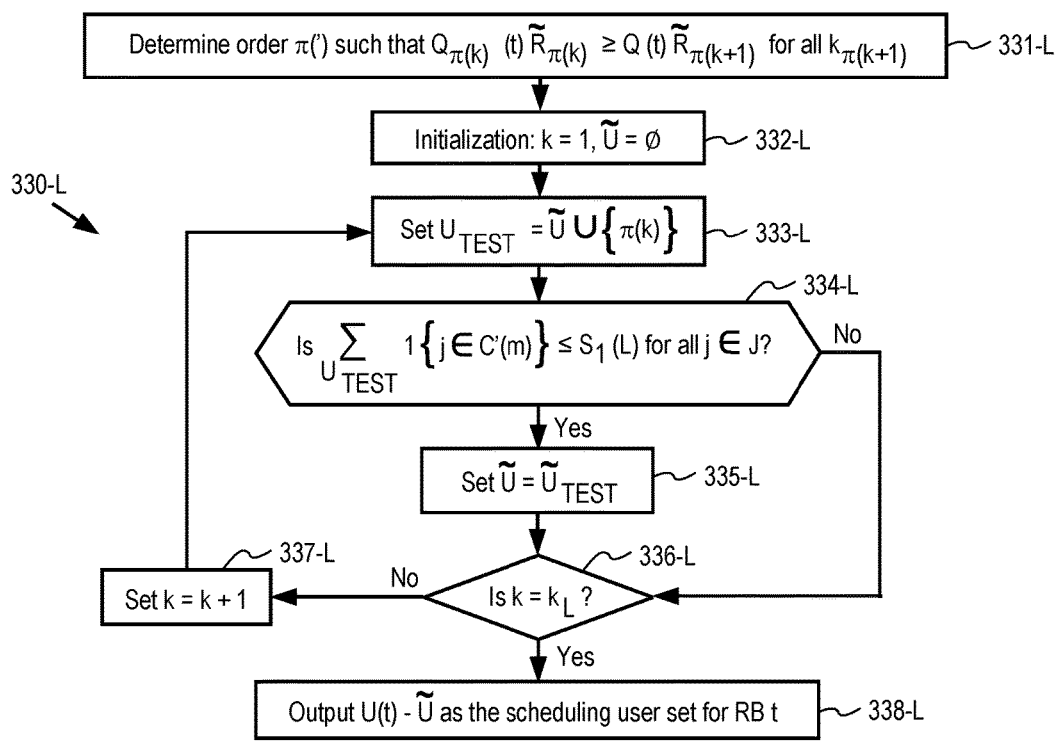
FIG. 5 is a data flow diagram depicting one embodiment of a process for performing instantaneous scheduling as performed by a cluster scheduler unit.

Operation 330-L involves embodiments whose goal is to schedule users across the network at time t, so that the constraints in (Equation 7b) are satisfied, and the weighted sum-rate quantity in (Equation 7a) is as large as possible. Problem (Equation 7a)-(Equation 7b) is an integer linear problem and thus combinatorial by nature. A number of heuristic algorithms can be used to provide feasible solutions to the integer linear program (Equation 7a)-(Equation 7b) and thus embodiments associated with operation 330-L. In one embodiment, a rudimentary greedy WSRM optimization is used as an alternative to solving (Equation 7a)-(Equation 7b). Letting $K_L = |\mathcal{U}^{(L)}|$ denote the total number of users that are to be served via BS-clusters of size L, the greedy algorithm at time t operates as described in the flow diagram in FIG. 5. Referring to FIG. 5, the users are sorted as shown in Step 331-L. In particular a user order $\pi(k)$ is determined, for which $Q_{\pi(k)}(t)\tilde{R}_{\pi(k)} \geq Q_{\pi(k+1)}(t)\tilde{R}_{\pi(k+1)}$ for all k. An initialization operation 332-L follows where the iteration index k is initialized to 1 and the set of the users selected thus far is initialized as the empty set. The algorithm then tests users in the order $\pi(k)$, one at time, to determine if a user satisfies the constraints in (Equation 7b), and if so, the user is included in the scheduling set. Specifically at iteration k, the user with index $\pi(k)$ is combined with the set of selected users thus far in a set $\mathcal{U}_{TEST}$ (operation 333-L).

Operation 334-L checks whether or not the set $\mathcal{U}_{TEST}$ is a feasible scheduling set, that is, if it satisfies the constraints in (Equation 7b). Only if the set $\mathcal{U}_{TEST}$ satisfies all the constraints in (Equation 7b) the user with index π(k) is added in the set of users scheduled so far (operation 335-L). Operation 336-L then checks whether or not all users have been checked. If all users have been checked the algorithm outputs the set of users to schedule (operation 338-L). If however, not all users have been checked, the iteration index is incremented (operation 337-L), and the algorithm goes back to operation 333-L to repeat the operation for the next user in the order π(k).

In one embodiment, scheduler units do not truncate the $\{x_k \mathcal{C}\}$'s to unique association $\{\tilde{x}_k \mathcal{C}\}$ sets. One such embodiment generates for each user k a reward rate $\tilde{R}_k \mathcal{C} = 1/x_k \mathcal{C}$ for each (user k, cluster $\mathcal{C}$) combination for which $x_k \mathcal{C} > 0$. In one embodiment the mechanism for scheduler unit 330-L operates based on treating each (user k, cluster $\mathcal{C}$) combination for which $x_k \mathcal{C} > 0$ as a "virtual" user and applying the mechanism in FIG. 5 on this virtual user set with the following changes:

$K_L$ denotes the set of virtual users (i.e., the number of physical user/cluster combinations with non-zero activity fractions and for which the cluster size is L).

If the condition 334-L is "YES" for a virtual user (combination of physical user and cluster), then operation 335-L is replaced with the following operations:

The virtual user is included in the scheduling set (i.e. the combination of physical user and cluster is included in the scheduling set, but also every other virtual user (user cluster combination)

All other virtual users (i.e., all combinations of physical user and cluster), for which the physical user is the same as the physical user of the scheduled virtual user (combination of physical user and cluster) are removed from the search set; assuming that there are n such virtual users, the value of $K_L$ is decremented by n.

Disclosed mechanisms for resource allocation and scheduling focus on the UCS architecture of Definition 2. Such an architecture places some restrictions in scheduling: in the context of the example in Table 1, for instance, the UCS architecture allows serving RBs of the types of #1, #2, and #3, but not of type #4. Embodiments amounting to straightforward extensions of the invention can also be developed based on scheduling policies that also allow serving users in the form shown in the RB #4 of Table 1. In one embodiment, the disclosed mechanisms are applied on the following mixed cluster-size architectures:

Definition 4: Mixed Cluster-Size Architecture (MCS)

A scheme that falls within the class of Definition 1 is a MCS architecture, if $\lambda_L \geq 0$ fraction of the RBs is allocated to size L, for all $L \in \{2, \ldots, L_{max}\}$, and if within any RB that is part of the $\lambda_L$ fraction the following are satisfied:

(i) Each scheduled user is served either in cellular mode, or by a (user-dependent) cluster of L BSs;

(ii) For each j∈J, BS j serves either at most $S_j$ users all in cellular mode, or at most $S_j(L)$ users, all served in clusters of size L.

In the case of the MSC architectures of Definition 4, a convex NUM problem can be posed, similar to the one described by the set (Equation 6a)-(Equation 6b) for the UCS architecture. In one embodiment of the invention the load balancer unit 310 pertains to a method and apparatus solving this convex NUM problem for the MCS architecture. Furthermore, embodiments of the scheduling mechanisms for the MCS architecture can be readily obtained via straightforward extensions of the associated scheduling mechanisms 320-1, 320-2, . . . , 320-$L_{max}$, disclosed for the UCS architecture.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for allocating resources over a wireless network having a plurality of base stations for transmission to a plurality of user-terminals (UTs) and for scheduling simultaneous transmissions to the UTs, with each UT being served by a single base station or jointly by multiple base stations, the method comprising:

allocating portions of the resources available to a subset of base stations of the plurality of base stations to serve a subset of UTs from clusters of base stations with cluster sizes including at least one with two or more base stations, each of the portions of resources allocated to serve one UT via a user-dependent cluster of base stations;

sending resource allocations and activity fractions, including an indication of which UTs are to be served, to cluster schedulers of the clusters of base stations, the cluster schedulers operable to schedule UT transmissions over the subset of base stations; and scheduling, by the cluster schedulers, UT transmissions over the subset of base stations and scheduling slots in response to the resource allocations and activity fractions, wherein within each of the scheduling slots one or more user terminals are scheduled for transmission, each by its user-dependent cluster of base stations.

2. The method defined in claim 1 wherein the portions of resources are based on fractions.

3. The method defined in claim 1 wherein, for at least one resource allocation to at least one subset of base stations, the set of cluster sizes comprises a single value.

4. The method defined in claim 1 wherein allocating portions of the resources comprises performing at least one resource allocation to at least one subset of base stations with cluster sizes of 1 and greater than one.

5. The method defined in claim 1 wherein allocating portions of the resources comprises allocating portions of resources based on a network utility metric.

6. The method defined in claim 5 wherein the fractions are chosen based on their effect on a network utility metric.

7. The method defined in claim 1 wherein scheduling UT transmissions over the subset of base stations and scheduling slots comprises scheduling transmissions from each cluster of base stations to each user terminal so that each user terminal is allocated transmission slots in accordance to the fraction of resources determined by a resource-allocation mechanism.

8. The method defined in claim 1 wherein scheduling UT transmissions over the subset of base stations and scheduling slots comprises generating a schedule with scheduled transmissions to a user terminal from a first set of base stations being based on simultaneously transmitting identical coded data to the user terminal from each base station of the first set of base station using a precoded beam designed locally at said each base station based on channel state information between said each base station and user terminals scheduled for transmission from said each base station.

9. A controller for use in a wireless network having a plurality of base stations for transmission to a plurality of user-terminals (UTs) in which transmissions to the UTs are scheduled simultaneously, with each UT being served by a single base station or jointly by multiple base stations, the controller comprising:
a receiver to receive, from base stations in the plurality of base stations, channel state information;
a resource allocation unit to allocate, based on estimates of channels between base stations and UTs that the base stations serves in each slot, portions of the resources available to a subset of base stations of the plurality of base stations to serve a subset of UTs from clusters of base stations with cluster sizes including at least one with two or more base stations, each of the portions of resources allocated to serve one UT via a user-dependent cluster of base stations; and
a transmitter coupled to the resource allocation unit to transmit resource allocations and activity fractions, including an indication of which UTs are to be served, to cluster schedulers of the clusters of base stations, the cluster schedulers operable to schedule UT transmissions over the subset of base stations.

10. The controller defined in claim 9 wherein the portions of resources are fractions of the resources.

11. The controller defined in claim 9 wherein, for at least one resource allocation to at least one subset of base stations, the set of cluster sizes comprises a single value.

12. The controller defined in claim 9 wherein the resource allocation unit is operable to allocate portions of the resources by performing at least one resource allocation to at least one subset of base stations with cluster sizes of 1 and greater than one.

13. The controller defined in claim 9 wherein the resource allocation unit is operable to allocate portions of the resources based on a network utility metric.

14. The controller defined in claim 13 wherein the fractions are chosen based on their effect on the network utility metric.

15. A base station comprising:
a scheduler to receive an indication of UTs that are to be served and fractions of available transmission resources between UT-cluster pairs and to determine a slot-by-slot schedule in accordance with the fractions, the indication of UTs that are to be served and fractions of available transmission resources between UT-cluster pairs being received via a cluster scheduler, from a resource allocation unit operable to allocate, based on estimates of channels between base stations and UTs that the base stations serves in each slot, portions of the resources available to a subset of base stations of the plurality of base stations to serve a subset of UTs from clusters of base stations with cluster sizes including at least one with two or more base stations, each of the portions of resources allocated to serve one UT via a user-dependent cluster of base stations; and
a transmitter and receiver to communicate with UTs in accordance with the slot-by-slot schedule.

16. The base station defined in claim 15 wherein the scheduler is operable to receive scheduling information from cluster schedulers and scheduling information from a cellular scheduler.

17. The base station defined in claim 15 wherein the scheduler uses max-min scheduling with peak rates which are inversely proportional to the fractions.

18. A wireless network comprising:
a plurality of base stations
a plurality of user terminals; and
a controller comprising
a receiver to receive, from base stations in the plurality of base stations, channel state information;
a resource allocation unit to allocate, based on channel state information, portions of the resources available to a subset of base stations of the plurality of base stations to serve a subset of UTs from clusters of base stations with cluster sizes including at least one with two or more base stations, each of the portions of resources allocated to serve one UT via a user-dependent cluster of base stations,
a transmitter coupled to the resource allocation unit to transmit resource allocations and activity fractions, including an indication of which UTs are to be served, to cluster schedulers of the clusters of base stations, the cluster schedulers operable to schedule UT transmissions over the subset of base stations,
wherein cluster schedulers of the base stations are operable to schedule UT transmissions over the subset of base stations and scheduling slots in response to the resource allocations and activity fractions, wherein within each of the scheduling slots one or more user terminals are scheduled for transmission, each by its user-dependent cluster of base stations.

19. The wireless network defined in claim 18 wherein the portions of resources are fractions of the resources.

20. The wireless network defined in claim 18 wherein, for at least one resource allocation to at least one subset of base stations, the set of cluster sizes comprises a single value.

21. The wireless network defined in claim 18 wherein the resource allocation unit is operable to allocate portions of the resources by performing at least one resource allocation to at least one subset of base stations with cluster sizes of 1 and greater than one.

22. The wireless network defined in claim 18 wherein the resource allocation unit is operable to allocate portions of the resources based on a network utility metric.

23. The wireless network defined in claim 22 wherein the portions of the resources are fractions of available resources and the resource allocation unit is operable to allocate portions of the resources to increase the network utility metric.

24. The wireless network defined in claim 18 wherein the schedulers are operable to schedule UT transmissions over the subset of base stations and scheduling slots comprises scheduling transmissions from each cluster of base stations to each user terminal at a fraction of resources allocated by a resource-allocation mechanism.

25. The wireless network defined in claim 18 wherein the schedulers are operable to schedule UT transmissions over the subset of base stations and scheduling slots comprises generating a schedule with scheduled transmissions to a user terminal from a first set of base stations being based on simultaneously transmitting identical coded data to the user terminal from each base station of the first set of base station using a precoded beam designed locally at said each base station based on channel state information between said each base station and user terminals scheduled for transmission from said each base station.

26. An article of manufacture having one or more computer readable storage media storing executable instructions thereon which when executed cause a method for allocating resources over a wireless network having a plurality of base stations for transmission to a plurality of user-terminals (UTs) and for scheduling simultaneous transmissions to the UTs, with each UT being served by a single base station or jointly by multiple base stations, the method comprising:

allocating portions of the resources available to a subset of base stations of the plurality of base stations to serve a subset of UTs from clusters of base stations with cluster sizes including at least one with two or more base stations, each of the portions of resources allocated to serve one UT via a user-dependent cluster of base stations;

sending resource allocations and activity fractions, including an indication of which UTs are to be served, to cluster schedulers of the clusters of base stations, the cluster schedulers operable to schedule UT transmissions over the subset of base stations; and scheduling, by the cluster schedulers, UT transmissions over the subset of base stations and scheduling slots in response to the resource allocations and activity fractions, wherein within each of the scheduling slots one or more user terminals are scheduled for transmission, each by its user-dependent cluster of base stations.

27. The article of manufacture defined in claim 26 wherein the portions of resources are fractions of the resources.

28. The article of manufacture defined in claim 26 wherein, for at least one resource allocation to at least one subset of base stations, the set of cluster sizes comprises a single value.

29. The article of manufacture defined in claim 26 wherein allocating portions of the resources comprises performing at least one resource allocation to at least one subset of base stations with cluster sizes of 1 and greater than one.

30. The article of manufacture defined in claim 26 wherein allocating portions of the resources comprises allocating portions of resources based on a network utility metric.

31. The article of manufacture defined in claim 30 wherein the portions of the resources are fractions of available resources and allocating the fractions of available resources is to increase the network utility metric.

32. The article of manufacture defined in claim 26 wherein scheduling UT transmissions over the subset of base stations and scheduling slots comprises scheduling transmissions from each cluster of base stations to each user terminal at a fraction of resources allocated by a resource-allocation mechanism.

33. The article of manufacture defined in claim 26 wherein scheduling UT transmissions over the subset of base stations and scheduling slots comprises generating a schedule with scheduled transmissions to a user terminal from a first set of base stations being based on simultaneously transmitting identical coded data to the user terminal from each base station of the first set of base station using a precoded beam designed locally at said each base station based on channel state information between said each base station and user terminals scheduled for transmission from said each base station.

* * * * *